US012369044B2

United States Patent
Barritt et al.

(10) Patent No.: US 12,369,044 B2
(45) Date of Patent: *Jul. 22, 2025

(54) TEMPOROSPATIAL, SOFTWARE-DEFINED MARITIME NETWORK USING HIGH-ALTITUDE PLATFORMS

(71) Applicant: Aalyria Technologies, Inc., Livermore, CA (US)

(72) Inventors: Brian Barritt, San Jose, CA (US); Sharath Ananth, Cupertino, CA (US)

(73) Assignee: AALYRIA ECHNOLOGIES, INC., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,063

(22) Filed: Jun. 6, 2024

(65) Prior Publication Data

US 2024/0323702 A1    Sep. 26, 2024

Related U.S. Application Data

(63) Continuation of application No. 18/314,145, filed on May 9, 2023, now Pat. No. 12,035,148, which is a
(Continued)

(51) Int. Cl.
*H04W 16/18*     (2009.01)
*H04W 84/06*     (2009.01)

(52) U.S. Cl.
CPC ............ *H04W 16/18* (2013.01); *H04W 84/06* (2013.01)

(58) Field of Classification Search
CPC ..... H04W 16/18; H04W 84/06; H04W 40/18; H04W 40/20; H04B 7/18504
See application file for complete search history.

(56) References Cited

U.S. PATENT DOCUMENTS

| 7,327,698 B1 | 2/2008 | Anselmo |
| 8,116,763 B1 | 2/2012 | Olsen |

(Continued)

FOREIGN PATENT DOCUMENTS

WO    2018200690 A1    11/2018

OTHER PUBLICATIONS

Barritt Brian et al: "Loon SDN: Applicability to NASA's next-generation space communications architecture", 2018 IEEE Aerospace Conference, IEEE, Mar. 3, 2018 (Mar. 3, 2018), pp. 1-9, XP033365389, DOI: 10.1109/AERO.2018.8396643, Section 4.
(Continued)

*Primary Examiner* — Hoang-Chuong Q Vu
(74) *Attorney, Agent, or Firm* — BAKER HOSTETLER, LLP

(57) ABSTRACT

A maritime network provides network coverage for nautical or aerospace vehicles traveling over the sea. Generating the network configuration for the maritime network includes receiving client information for client devices in range of a given node of the maritime network for a period of time that the client devices are traveling asea, as well as location information for the period of time from a plurality of nodes in the network including the given node. Based on the client information and the location information, a network configuration is determined to include a plurality of links to be formed for routing paths through the maritime network. The routing paths are configured to transmit data related to the client devices, and the plurality of links includes a link between the given node and another node in the network that is within a maximum distance from the given node.

20 Claims, 10 Drawing Sheets

Related U.S. Application Data continuation of application No. 17/146,107, filed on Jan. 11, 2021, now Pat. No. 11,689,935.

(56) References Cited

U.S. PATENT DOCUMENTS

| | | | |
|---|---|---|---|
| 9,363,008 B2 | 6/2016 | Boss et al. | |
| 9,363,690 B1 | 6/2016 | Singh et al. | |
| 9,476,716 B2 | 10/2016 | Opshaug et al. | |
| 10,629,097 B1 | 4/2020 | Teller et al. | |
| 10,897,716 B1 | 1/2021 | Ananth et al. | |
| 11,075,817 B1 * | 7/2021 | Trim | H04W 16/26 |
| 11,196,157 B1 | 12/2021 | Bonney et al. | |
| 11,277,203 B1 | 3/2022 | Mclinden et al. | |
| 11,310,719 B1 | 4/2022 | Boschulte et al. | |
| 11,403,814 B2 * | 8/2022 | Winkle | G06T 17/05 |
| 11,601,191 B2 | 3/2023 | Gokhale et al. | |
| 11,757,526 B1 | 9/2023 | Chen et al. | |
| 11,871,298 B2 | 1/2024 | Hayes et al. | |
| 2010/0168942 A1 | 7/2010 | Noffsinger et al. | |
| 2013/0163516 A1 | 6/2013 | Baek et al. | |
| 2014/0010155 A1 | 1/2014 | Kim | |
| 2015/0236778 A1 | 8/2015 | Jalali | |
| 2016/0037434 A1 | 2/2016 | Gopal et al. | |
| 2016/0300494 A1 | 10/2016 | Trent et al. | |
| 2017/0310550 A1 | 10/2017 | Mandle et al. | |
| 2017/0328678 A1 | 11/2017 | Burke et al. | |
| 2018/0149727 A1 | 5/2018 | Ostrem | |
| 2018/0290731 A1 * | 10/2018 | Ishibashi | H04Q 9/00 |
| 2019/0080621 A1 | 3/2019 | Guerrini et al. | |
| 2019/0116544 A1 | 4/2019 | Glottmann | |
| 2019/0174276 A1 | 6/2019 | Azevedo | |
| 2020/0012281 A1 | 1/2020 | Jaegal | |
| 2020/0204439 A1 | 6/2020 | Scott | |
| 2020/0228583 A1 | 7/2020 | Barritt et al. | |
| 2020/0245210 A1 | 7/2020 | Fotheringham et al. | |
| 2020/0322055 A1 | 10/2020 | Jones | |
| 2020/0408922 A1 | 12/2020 | Stockmaster | |
| 2021/0092640 A1 | 3/2021 | Ravishankar et al. | |
| 2021/0159970 A1 | 5/2021 | Hong et al. | |
| 2021/0184758 A1 | 6/2021 | Barritt et al. | |
| 2021/0203608 A1 | 7/2021 | Regunathan et al. | |
| 2021/0263164 A1 | 8/2021 | Gunning et al. | |
| 2021/0328662 A1 * | 10/2021 | Qaise | H04B 7/18539 |
| 2021/0360493 A1 * | 11/2021 | Shrestha | H04W 36/0061 |
| 2021/0371065 A1 | 12/2021 | Dokken et al. | |
| 2022/0053607 A1 | 2/2022 | Rice et al. | |
| 2022/0086713 A1 | 3/2022 | Määttänen et al. | |
| 2022/0104028 A1 | 3/2022 | Chen et al. | |
| 2023/0195144 A1 | 6/2023 | Shattil | |

OTHER PUBLICATIONS

International Search Report and Written Opinion by ISA/EPO of PCT/US2021/056144 dated Jul. 2, 2022.

* cited by examiner

TEMPOROSPATIAL, SOFTWARE-DEFINED MARITIME NETWORK USING HIGH-ALTITUDE PLATFORMS

BACKGROUND

The world sees an increased demand in data connectivity, with higher throughputs, lower latencies and availability in more geographies. Information can be transmitted over directional point-to-point networks, such as aerospace and other mobile networks. In such networks, links can be formed between pairs of nodes by aiming transceivers of each node pair towards each other. In some implementations, nodes may include non-geostationary satellite orbit (NGSO) satellites or other aerospace platforms that are in motion relative to the Earth. Aerospace platforms such as equipment-laden balloons floating in the stratosphere may communicate with each other and with ground-based networking equipment and mobile devices to connect people on the ground or other vehicles on land, at sea, or aircraft at lower altitudes.

BRIEF SUMMARY

Aspects of the disclosure provide for systems and methods for planning a configuration for a maritime network that is capable of providing coverage to nautical or aerospace vehicles traveling at varying distances from land and therefore traveling in and out of range of existing terrestrial nodes.

Some aspects of the disclosure provide for a method of generating a network configuration for a maritime network. The method includes receiving, by one or more processors, client information for one or more client devices in range of a given node of the maritime network for a period of time that the one or more client devices are traveling asea; receiving, by the one or more processors, location information for the period of time from a plurality of nodes in the network including the given node, the location information including predicted or known trajectories of at least one maritime node and at least one aerospace node in the maritime network; and based on the client information and the location information, determining, by the one or more processors, a network configuration including a plurality of links to be formed for one or more routing paths through the maritime network, wherein the one or more routing paths are configured to transmit data related to the one or more client devices, and the plurality of links includes a link between the given node and another node in the network that is within a maximum distance from the given node.

In one example, the maximum distance is defined by a type of communication signal used for the plurality of links. In another example, the plurality of nodes further includes a terrestrial node on a first land mass and a second terrestrial node on a second land mass separate from the first land mass. In a further example, the determining of the network configuration includes determining one or more additional node locations for the network configuration. In this example, the determining of the one or more additional node locations optionally includes identifying at least one zone in a path for the given node where there is a lack of backhaul coverage; and determining the one or more additional node locations to form a complete backhaul link for the given node. Further here, the identifying the at least one zone is also optionally based on where there is a highest amount of traffic in over time.

Alternatively in this example, the method also includes sending instructions to one or more nodes of the network to travel to the one or more additional node locations to implement the network configuration. Further here, the instructions optionally include instructions to perform station keeping at the one or more additional node locations. Also further here, the one or more additional node locations optionally include aerospace locations, and the one or more nodes include aerospace nodes. Still further here, the one or more additional node locations optionally include maritime locations, and the one or more nodes optionally include maritime nodes.

Other aspects of the disclosure provide for a system that includes a network controller including one or more processors configured to communicate with a plurality of nodes in a maritime network. The one or more processors are configured to receive client information for one or more client devices in range of a given node of the maritime network for a period of time that the one or more client devices are traveling asea; receive location information for the period of time from a plurality of nodes in the network including the given node, the location information including predicted or known trajectories of at least one maritime node and at least one aerospace node in the maritime network; and based on the client information and the location information, determine a network configuration including a plurality of links to be formed for one or more routing paths through the maritime network, wherein the one or more routing paths are configured to transmit data related to the one or more client devices, and the plurality of links includes a link between the given node and another node in the network that is within a maximum distance from the given node.

In one example, the maximum distance is defined by a type of communication signal used for the plurality of links. In another example, the plurality of nodes also includes a terrestrial node on a first land mass and a second terrestrial node on a second land mass separate from the first land mass. In a further example, the network configuration is determined to include one or more additional node locations for the network configuration. In this example, the one or more processors are optionally also configured to determine the one or more additional node locations based on at least one zone in a path for the given node where there is a lack of backhaul coverage; and requirements for forming a complete backhaul link for the given node. Further here, the at least one zone is optionally based on where there is a highest amount of traffic in over time.

Alternatively in this example, the one or more processors are optionally also configured to send instructions to one or more nodes of the network to travel to the one or more additional node locations to implement the network configuration. Further here, the instructions optionally include instructions to perform station keeping at the one or more additional node locations. Also further here, the one or more additional node locations optionally include aerospace locations, and the one or more nodes optionally include aerospace nodes. Still further here, the one or more additional node locations optionally include maritime locations, and the one or more nodes optionally include maritime nodes.

DESCRIPTION

DETAILED DESCRIPTION

Overview

Figure 1:
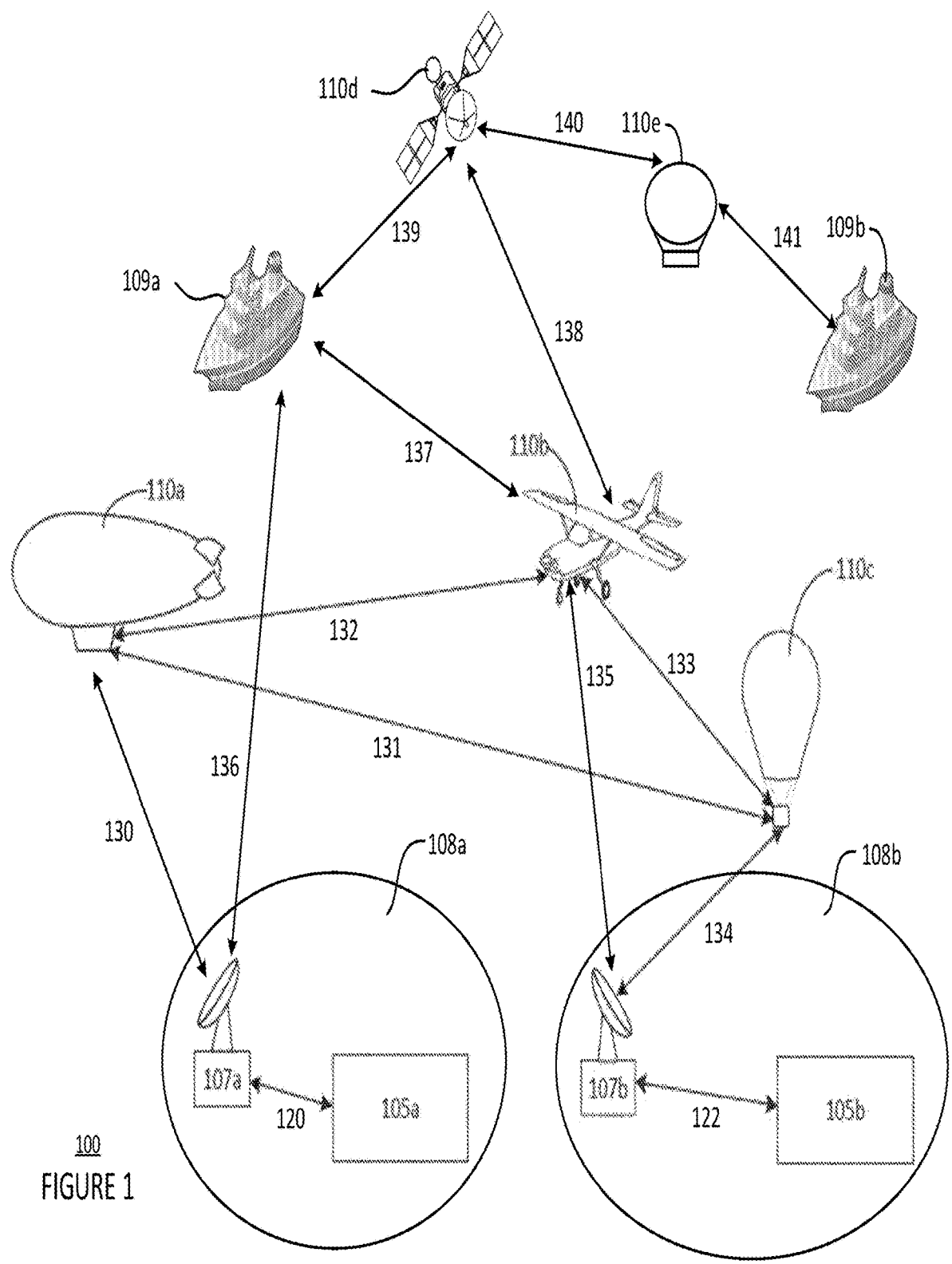
FIG. 1 is a pictorial diagram of an example directional point-to-point network 100 in accordance with aspects of the disclosure.

The technology relates to a maritime mesh network that services ships or planes using a combination of aerospace nodes, maritime nodes, and terrestrial nodes. The maritime mesh network may be designed based on route characteristics for certain vehicles that travel on or near the sea, such as ships or planes. For example, the route characteristics may include a proximity to a landmass. When the route is within a maximum distance from a landmass, a link between a ship and a terrestrial node may be established. When the route is outside the maximum distance from a landmass, one or more aerospace nodes or maritime nodes may form additional links between the vehicle and a terrestrial node. Aerospace nodes may include balloons, airplanes, sea drones, or other airborne platforms, and maritime nodes may include ships, buoys, or other platforms asea, and A network may include a plurality of nodes, including a plurality of terrestrial nodes, at least one maritime node, and at least one aerospace node. Each node may include a free-space optical communication (FSOC) system configured to form one or more line-of-sight, optical communication links to communicate with one another. The terrestrial nodes may be terrestrial towers or other types of nodes positioned at various locations on land. The FSOC system for a given terrestrial node may be positioned at a height at a same or similar height as that of an FSOC system for the at least one maritime node. The at least one maritime node may be on a platform at sea. The aerospace node may be on a stratospheric balloon, a low earth orbit satellite, or other airborne platform that travels in the air and can move relative to the ground.

To serve one or more client devices, a network controller may receive client information, such as from a vehicle in which a client device is. The client information may include client location information and client data information. The client location information may indicate the location of the vehicle when the one or more client devices are in communication with the vehicle. The client data information may include an amount of data to be transmitted from or to the one or more client devices.

The network controller may also receive location information from each of the plurality of nodes, including the vehicle associated with the one or more client devices. The location information may include a predicted trajectory for the at least maritime node or the at least one aerospace node may be based on a current location and travel characteristics.

The known trajectory may be a route, including such as a position or a range of positions of the vehicle over time. The route may include a schedule of when the vehicle is at positions along the route. The location information may also include conditions at or near each location of the plurality of nodes.

Based on the client information and the location information, the network controller may determine a network configuration including a plurality of links to be formed for one or more routing paths through the network. To determine the network configuration, the network controller may take into account the location information for location of the vehicle associated with the given client device, a predicted amount of data to be routed to and from the vehicle, location information for the plurality of nodes in the network, and conditions at each of the locations of the plurality of nodes.

In particular, the network configuration may be determined so that distances between hops along a route are less than a maximum distance. When the vehicle associated with the one or more client devices is located more than the maximum distance from any terrestrial node, the network configuration may include a link between the vehicle and an aerospace node or a maritime node as a first hop before a second hop to a terrestrial node. When the vehicle is one of the plurality of maritime nodes traveling along the same or similar route, the network configuration may include one or more links with another maritime node in the plurality of maritime nodes.

Additionally, the network controller may determine one or more aerospace locations for the network configuration. To do so, the network controller may identify at least one zone where the vehicle is outside the maximum distance from another node in the network. The one or more aerospace locations may be determined to provide service to the vehicle when the given maritime node is in the at least one zone. For example, the one or more aerospace locations may be where aerospace nodes are in range of the at least one zone to link the vehicle in the at least one zone with another node of the network. The one or more aerospace locations may also be determined based on predicted conditions at the vehicle's location or between the vehicle's location and a possible aerospace location. The network controller may send instructions to one or more aerospace nodes to travel to and perform station keeping at the one or more aerospace locations. The one or more aerospace nodes may be selected based on the location information, system conditions, or other characteristics.

The technology herein creates a network that supports a nautical or aerospace vehicle that travels on or around the sea. Aerospace nodes and other maritime nodes may form a mesh network that can provide access or backhaul service to the vehicle from a terrestrial node even when the vehicle is not in range of the terrestrial node. By utilizing aerospace nodes, such as high-altitude platforms, and other maritime nodes, the cost of capacity and the latency in the network may be reduced. In addition, aerospace nodes may provide additional bandwidth for communications to and from the vehicle. Furthermore, being able to adjust locations of aerospace nodes may add robustness to the network when weather or objects near the vehicle possibly cause obstructions.

Example Systems

FIG. 1 is a pictorial diagram of an example directional point-to-point network 100. The network 100 is a directional point-to-point computer network consisting of nodes mounted on various land- and air-based devices, some of which may change position with respect to other nodes in the network 100 over time. For example, the network 100 includes terrestrial nodes associated with each of two land-based datacenters 105a and 105b (generally referred to as datacenters 105), other terrestrial nodes associated with each of two ground stations 107a, 107b (generally referred to as ground stations 107), and nodes associated with each of five aerospace platforms 110a-110e (generally referred to as aerospace platforms 110). The ground stations 107 may be terrestrial towers or other types of nodes positioned at various locations on land, such as along a shore. Ground station 107a may be at a first shore location 108a, and ground station 107b may be at a second shore location 108b. The second shore location 108b may be out of range of the first shore location 108a. In some scenarios, the first shore location 108a may be on a first island, and the second shore location 108b may be on a second island. The FSOC system for a given terrestrial node may be positioned at a height at a same or similar height as that of an FSOC system for at least one maritime node.

As shown, aerospace platform 110a is a blimp, aerospace platform 110b is an airplane, aerospace platform 110c, 110e are balloons, and aerospace platform 110d is a satellite. The network 100 may also include nodes associated with maritime platforms, such as ships 109a and 109b (generally referred to as ships 109). These maritime nodes may be configured to form a communication link with a client device and/or another node in the network 100. In some implementations, a client device may be a node of the network 100 or may be directly or indirectly connected to any node of the network 100. For example, a client device may be configured to form a communication link with any of ground station 107a, 107b, aerospace platform 110a-110e, or maritime platform 109a, 109b.

In some embodiments, nodes in network 100 may be equipped to perform free-space optical communication (FSOC), making network 100 an FSOC network. Additionally or alternatively, nodes in network 100 may be equipped to communicate via radio-frequency signals or other communication signals capable of travelling through free space. The FSOC system, or payload, for a given ground station 107 may be positioned at a height at a same or similar height as that of an FSOC system for at least one maritime platform 109 or a nautical vehicle configured to access the network 100. Arrows shown between a pair of nodes represent possible communication line-of-sight links 120, 122, 130-141 between the nodes. Link 120 may be between datacenter 105a and ground station 107a, and link 122 may be between datacenter 105b and ground station 107b. Aerospace platform 110a may be linked to ground station 107a, aerospace platform 110b, and aerospace platform 110c via links 130, 131, and 132, respectively. Aerospace platform 110b may be linked to aerospace platform 110c, ground station 107b, ship 109a, and aerospace platform 110d via links 133, 135, 137, and 138, respectively. Aerospace platform 110c may be linked to ground station 107b via link 134. Ship 109a may be linked to ground station 107a and aerospace platform 110d via links 136 and 139, respectively. Aerospace platform 110e may be linked to aerospace platform 110d and ship 109b via links 140 and 141, respectively.

The network 100 as shown in FIG. 1 is illustrative only, and in some implementations the network 100 may include additional or different nodes. For example, in some implementations, the network 100 may include additional aerospace platforms, which may be balloons, blimps, airplanes, unmanned aerial vehicles (UAVs), satellites, or any other form of high altitude platform, or additional maritime platforms, which may be buoys, unmanned nautical vehicles, oil rigs, or other types of maritime platforms. Some maritime platforms may be configured as a network node by tethering an aerospace platform, such as a balloon, to the maritime platform.

In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, aerospace platforms 110 and maritime platforms 109 can include wireless transceivers associated with a cellular or other mobile network, such as eNodeB base stations or other wireless access points, such as WiMAX or UMTS access points. Together, aerospace platforms 110 and maritime platforms 109 may form all or part of a wireless access network. Aerospace platforms 110 and maritime platforms 109 may connect to the datacenters 105, for example, via backbone network links or transit networks operated by third parties. The datacenters 105 may include servers hosting applications that are accessed by remote users as well as systems that monitor or control the components of the network 100. aerospace platforms 110 may provide wireless access for the users, and may forward user requests to the datacenters 105 and return responses to the users via the backbone network links.

Figure 2:
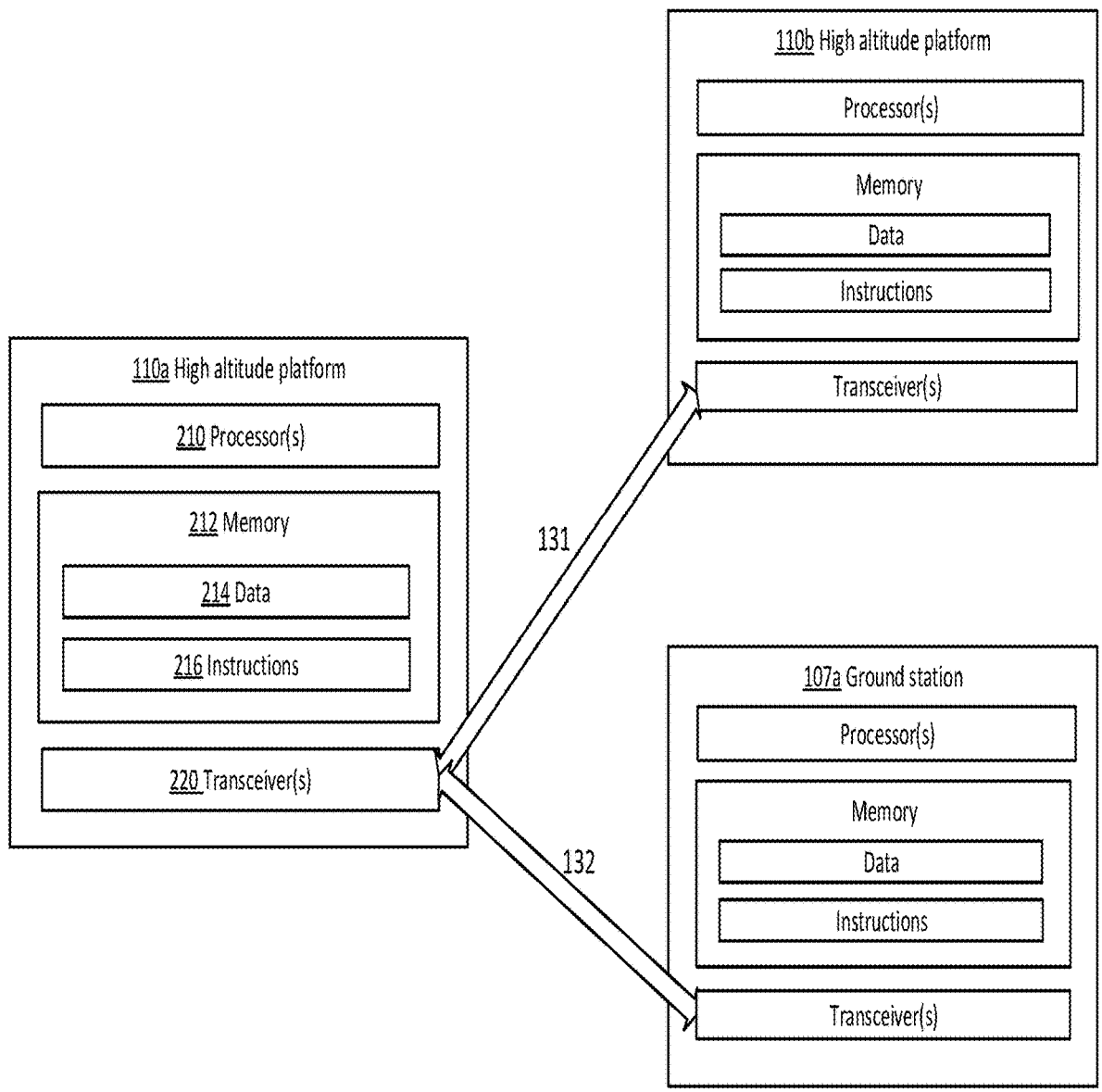
FIG. 2 is a functional diagram of a portion 200 of the network 100 shown in FIG. 1 in accordance with aspects of the disclosure.

As shown in FIG. 2, each node, such as ground stations 107 and aerospace platforms 110 may include one or more transceivers configured to create one or more links, such as links 120, 122, 130-141, between a given aerospace platform 110 and another node in the network. Referring to aerospace platform 110a, each of the nodes may include one or more processors 210, memory 212, and one or more transceivers 220. Other nodes including ground stations 107, aerospace platforms 110, and maritime platforms 109 of network 100 may include a same or similar configuration of components. For the sake of clarity and simplicity, only ground station 107a and aerospace platforms 110a, 110b are shown in FIG. 2. However, other ground stations, aerospace platforms, and maritime platforms in the network may have the same or as similar configuration as ground station 107b or aerospace platforms 110a, 110b.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214, and instructions 216, that may be executed by the one or more processors 210. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of aerospace platform 110a, a forwarding information base or forwarding data structure, such as a database or table, may be stored that indicate how signals received at each node should be forwarded, or transmitted. In other words, the memory of each node may store one or more forwarding rules for the corresponding node. For example, the forwarding table stored in memory 212 may include a forwarding rule that a signal received from ground station 107a should be forwarded to aerospace platform 110b.

Data 214 may be retrieved, stored or modified by the one or more processors 210 in accordance with the instructions 216. For instance, although the system and method are not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may be mounted to actuators that can be controlled, or steered, to point in a desired direction. To form a link between two nodes, such as the node associated with the aerospace platform 110a and the node associated with the aerospace platform 110b, the transceivers of the respective nodes can be controlled to point in the direction of one another so that data can be sent and received between the nodes. In some implementations, the power of the signals transmitted by each transceiver can also be controlled by the one or more processors of respective nodes to facilitate formation of the links 120, 122, 130-141 in the network 100 (see FIG. 1, for instance). For example, nodes that are separated by a relatively large distance can be configured to operate at a higher power to compensate for the reduction in signal-to-noise ratio that occurs over the distance separating the two nodes. Nodes that are spaced nearer to one another may be controlled to operate at a relatively lower power so as to save power.

Figure 3:
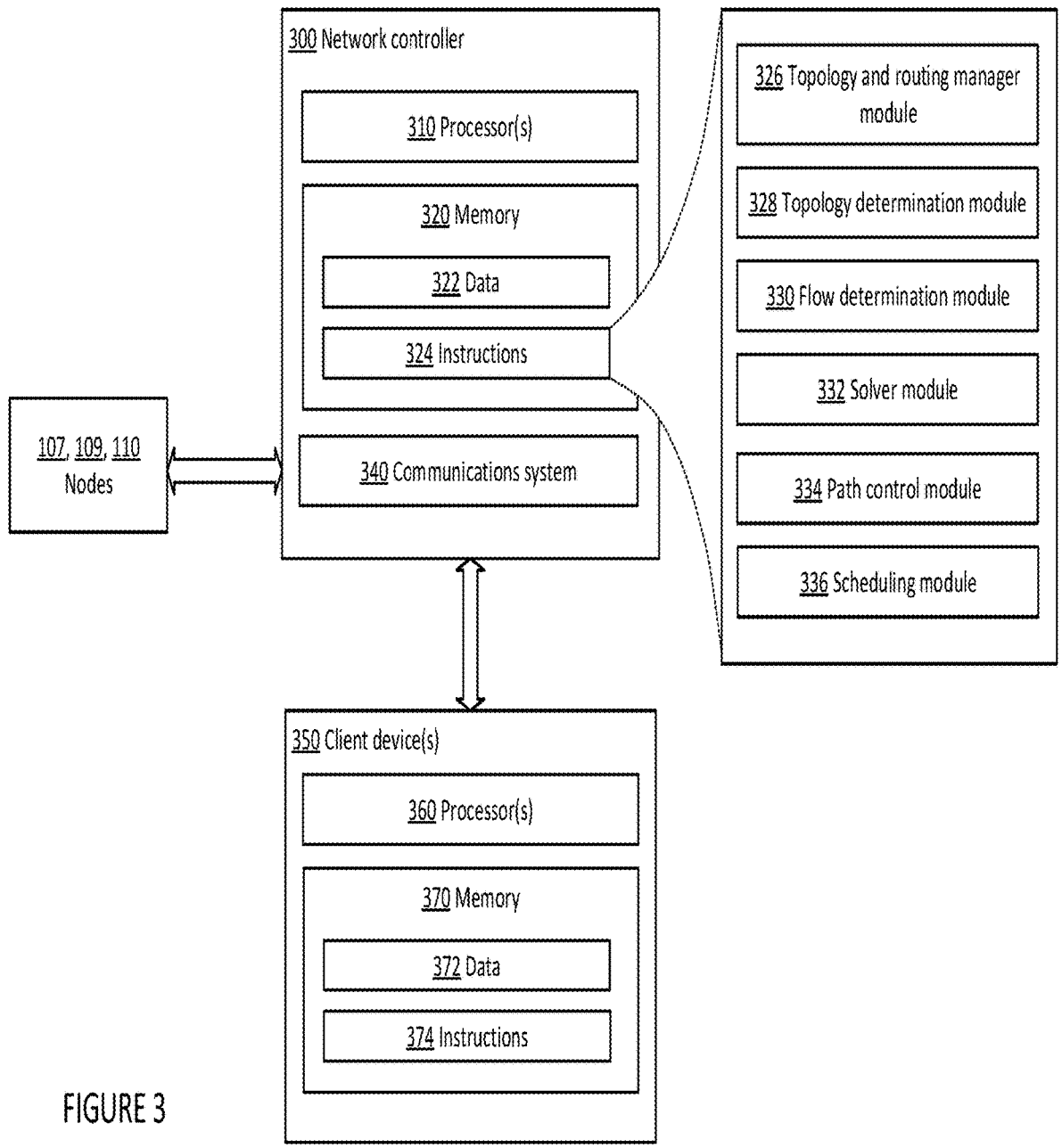
FIG. 3 is a functional diagram of a network controller 300 in accordance with aspects of the disclosure.

In some implementations, the network 100 can be a software-defined network (SDN) that is controlled by an SDN controller, such as network controller 300 depicted in FIG. 3. The network controller 300 may be located at one of the network nodes or at a separate platform, such as, for example, in one of the datacenters 105. The nodes of the network 100 can be configured to communicate with one another using the steerable transceivers, such as the one or more transceivers 220. As the aerospace platforms 110 and maritime platforms 109 move with respect to one another and with respect to the datacenters 105, ground stations 107, and other ground locations over time, some of the links shown in the block diagram of FIG. 1 may become infeasible. For example, the link 130 between the ground station 107a and the aerospace platform 110a may not be feasible when the path of the aerospace platform 110a brings the aerospace platform 110a into a position in which it is out of range of the ground station 107a, or in which the earth is positioned between it and the ground station 107a. In other examples, weather events between the aerospace platforms 110, the maritime platforms 109, and the ground locations may also render certain links unfeasible. Thus, due to the continuous movement of the aerospace platforms 110 and maritime platforms 109, the topology of the network 100 may require regular (i.e. periodic) or irregular reconfiguration to maintain connectivity and to satisfy determined network flows. The network controller 300 may be configured to determine configurations to efficiently satisfy determined network flows as further described below so as to be able to handle the demands of big data driven networking.

FIG. 3 is a functional diagram of network controller 300. The network controller 300 may be configured to send control messages to the network 100 to configure the topology of the network 100, to pass routing information to the nodes 107, 109, 110 of the network 100, and to schedule changes to the topology of the network 100 to transmit client data. As shown in FIG. 3, the network controller 300 may include one or more processors 310, memory, 320, and communications system 340. The one or more processors 310 may be similar to the one or more processors 210 described above.

Memory 320 may store information accessible by the one or more processors 310, including data 322 and instructions 324 that may be executed by processor 310. Memory 320, data 322, and instructions 324 may be configured similarly to memory 212, data 214, and instructions 216 described above. The data 322 may include a database, table, or other storage structure representing all of the available nodes and possible links in the network 100 at a given time or time frame, such as a table. The table may have a column for every node and link in the network 100 and a row for a time or time frame. In some cases, the columns and the rows may be reversed. The table may also store, for each node and each link, scheduled times or time frames during which the node or link is available. Alternatively, a graph or other form of information organization may be used. The instructions 324 may include a topology and routing manager module 326, a topology determination module 328, a flow determination module 330, a solver module 332, a path control module 334, and a scheduling module 336.

Returning to FIG. 3, the communications system 340 may be configured to communicate with the nodes 107, 109, 110 of network 100 as well as one or more client devices 350. In some embodiments, the communication system 340 includes a Control to Data-Plane Interface (CDPI) driver configured to communicate with a CDPI agent at each of the nodes 107, 109, 110. In addition, the communications system 340 of the network controller 300 may include one or more northbound interface (NBI) agents configured to communicate with an NBI driver at each client device 350 associated with one or more SDN applications. The communication system 340 may optionally or alternatively be configured to transmit and receive a signal via radio frequencies, optical frequencies, optical fiber, cable, or other communication means to and from the nodes 107, 109, 110 in the network 100 and the one or more client devices 350.

Each client device 350 may be a personal computing device or a server with one or more processors 360, memory 370, data 372, and instructions 374 similar to those described above with respect to the one or more processors 210 and 310, memories 212 and 320, data 214 and 322, and instructions 216 and 324. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices 350 may include any device capable of processing instructions and transmitting data to and from humans and other computers including general purpose computers, network computers lacking local storage capability, and set-top boxes for televisions. Some client devices 350 may be mounted on an aerospace or nautical vehicle traveling in range of the network 100. In some embodiments, client devices may be associated with one or more SDN applications and may have one or more NBI drivers.

Turning to the modules of the instructions 324 of FIG. 3, the topology and routing manager module 326 may cause the one or more processors 310 to interface between the network controller 300 and the network 100. Using the topology and routing manager module 326, the one or more processors 310 may receive information from each of the nodes within the network 100. For example, in some implementations, the topology and routing manager module 326 may cause the one or more processors 310 to receive information from each node 107, 109, 110 in the network 100 corresponding to the current location of each node, the predicted path of each node, the current links associated with each node, the routing information stored by each node, and the current storage capacity, for instance how many free or available bits can be utilized if any, at each node. The predicted path of each node may include known/registered flight plans of aerospace nodes 110 or known/registered voyage plans of maritime nodes 109. Information received from each node may also include weather conditions, turbulence, radiation, or other reports regarding other conditions that may affect FSOC between nodes. Each node also may send to the one or more processors 310 information corresponding to any failed links, which may occur due to unforeseen obstructions between nodes, turbulence at a node, or failure of one or more transceivers.

The topology and routing manager module 326 may also cause one or more processors 310 to receive predicted link metrics and conditions. For example, a predicted link metric may include a predicted value of a network performance metric for a hypothetical link that may be formed currently or in the future based on information received from the nodes 107, 109, 110. Network performance metrics may include bandwidth capacity, latency, or link lifetime duration, and can be based on the predicted relative motion or trajectory of the nodes 107, 109, 110 in the network 100. Link lifetime duration may represent the period of time during which a link is feasible in the network 100. Weather forecasts in node locations, predicted node locations or predicted links may also be received by the one or more processors 310 from the nodes 107, 109, 110 or optionally from a remote system.

Using the topology and routing manager module 326, the one or more processors 310 may store the information received from the network 100 in the memory 320. For instance, the table that represents all of the available nodes and possible links in the network 100 may be updated or annotated with information relevant for a particular node or link in the table. The annotations of the table may indicate availability of each node in the network 100, current and future locations of each node, current and future expected weather conditions, as well as a current amount of available storage at each of the nodes and a future (estimated) amount of available storage at each of the nodes in the network. In addition, the annotations of table may indicate the current and future availability of particular links as well as the current and future expected bandwidth for such links. Failed links and forecasted conditions may also be noted and stored in the table.

The topology determination module 328 may cause the one or more processors 310 to determine a current or future topology of the network 100. The determination of the current topology of the network 100 may be made based on the information received and stored by the one or more processors using the topology and routing manager module 326. For example, the topology determination module 328 may cause the one or more processors 310 to aggregate the information relating to the current location of each node 107, 109, 110, the links 130-141 formed between each pair of nodes, and any failed links that may exist within the network 100. The one or more processors 310 may receive this information through use of the topology and routing manager module 326, or may retrieve this information from the memory 320.

Additional information may also be used by the one or more processors 310 using the topology determination module 328 to determine the current topology of the network 100. Predicted link metrics received by the one or more processors 310 using the topology and routing manager module 326 and may also be used to determine the bandwidth, quality of service, and other characteristics of available links in the current topology. In some implementations, using the topology determination module 328, the one or more processors 310 may also receive information through using the path control module 334 corresponding to the flight paths of the airborne nodes, such as balloons 110*c*, 110*e*, or voyage paths of the maritime nodes, such as unmanned nautical vehicles, at a particular time or over a particular time frame at or near the current time, and the determination of the current topology may be made based also on the received flight information.

To determine a future topology of the network 100, the one or more processors 310 may aggregate location information, predicted link conditions, flight information, available storage and/or weather forecasts related to a future time using the topology determination module 328. The one or more processor 310 may access the information stored in the table or elsewhere in the memory 320 regarding available nodes and links at the future time, location information, predicted link conditions, flight information, and/or weather forecasts. The information for the future time may be used by the one or more processors 310 to determine where nodes are predicted to be and what the availability of nodes and links and storage capabilities at each node are predicted to be at the future time.

The topology determination module 328 may cause the one or more processors 310 to store the current or future topology or other topology information in the memory 320, such as by generating and or updating the table representing all of the available nodes and possible links in the network 100 and the scheduled times or time frames associated with each node or link.

The flow determination module 330 may cause the one or more processors 310 to determine all of the flows that are determined in the network 100 at a given time or time frame. A given flow may be one or more requirements for a routing path through the network 100. For example, each flow may comprise a start station, an end station, a time frame, a minimum bandwidth, or other requirement for transmission. The one or more processors 310 may determine the flows based on the topology information determined using the topology determination module 328 and/or information regarding characteristics of client data of the one or more client devices 350. The client data information may be received by the one or more processors 310 using the scheduling module 336 as described below from the one or more client devices 350 or a remote system. The client data information may include the sources and destinations for client data, an amount of client data to be transmitted, and/or a timing for transmission of client data. The amount of data may additionally or alternatively be an estimated average amount of data to be transmitted from or to a particular ground station or ground stations in a geographic area over a period of time.

The minimum bandwidth of a flow may be preset or predetermined by the one or more processors 310 given available system resources and link capabilities or alternatively, may be determined based on requirements included in the client data. Larger bandwidths may be set for flows transporting larger amounts of data. The one or more processors 310 may determine a flow between a start station and a destination station through the network capable of transmitting the amount of client data at the requested time. In some embodiments, the one or more processors 310 may also determine other information related to determined flows, such as the class of service or quality of service for each determined flow. The other information may be based on requirements received from the client device.

In some implementations, the flow determination module 330 may cause the one or more processors 310 to aggregate the client data from the one or more client devices 350 to determine the total amount of bandwidth required between each node pair in the network 100. The aggregated client data may be stored, for example, in the memory 320. Furthermore, the client data may be aggregated at a granular level. For example, the network data for each pair of nodes may be aggregated by class of service, quality of service, or any other relevant network traffic discriminator. The flows may be determined further based on any relevant network traffic discriminator.

In other cases, historical client data trends may be used to predict the client data amounts, sources, and destinations at a future point in time. The flow determination module 330 may cause the one or more processors 310 to determine a plurality of available flows between every node directly connectable to a client device at the future point in time. Directly connectable nodes may be able to communicate with a client device without use of the network 100. The predicted client data amounts between each node pair may be used to determine the bandwidth requirements between each node pair.

Alternatively, in the absence of client data information, the one or more processors 310 may determine a plurality of available flows between every node directly connectable to a client device at the current or future time. The determination of the plurality of available flows may be based on the current or future topology. In addition, the determination may be based on minimum system requirements.

The flow determination module 330 may cause the one or more processors 310 to store the determined flows in the memory 320. In some examples, the one or more processors 310 may annotate the table with the flows.

The solver module 332 may cause the one or more processors 310 to generate a network configuration or a schedule of network configurations based on the topology of the network, such as based on the topology represented in the table stored in the memory. The network configuration(s) generated using the first solver module may be a primary configuration to be implemented over other possible configurations. The network configuration may represent a feasible network topology that is capable of satisfying all determined network flows and may include a list of nodes and links that would be in use in the feasible network topology and a schedule of when the nodes and links would be in use. The schedule of network configurations may represent a feasible series of network topologies that are capable of satisfying all determined network flows. The feasible series of network topologies may include a list of nodes and links and a schedule of when the nodes and links would be in use for each network configuration in the schedule of network configurations. In some examples, the feasible series of network topologies includes a network topology during which data may be stored at a node having available storage and a next network topology in which the node forms a new connection or link with another node and transmits the data via the newly established link.

The network configuration(s) may be generated by the one or more processors 310 based on the topology for a given point in time in the table and on the network performance metrics of the topology at the given point in time. Various network performance metrics, such as, for example, link bandwidth, link latency, flow bandwidth, flow priority, link switching time (i.e., the time required to implement a new topology in the network 100), link duration, and/or topology duration, may be modeled as weighted constraints for the topology at the given point in time. In some embodiments, one or more network performance metrics may not be included in the table stored in the memory, but may be received from another module, another node, or from a remote system.

The one or more processors 310 may also compute routing paths for the determined flows over the topology represented by the network configuration. A given routing path may be one way to implement a given flow that satisfies the determined flow requirements and may include specific nodes and links in the network, or a list of hops between a series of nodes. In some examples, the given routing path may include a node having available storage that satisfies the determined flow requirement regarding an amount of data to be transmitted through the network. Data following the given routing path may be stored at the node for a period of time before travelling to a next hop.

In addition, information corresponding to a previous state of the network and a previous network topology may also be used to determine the network configuration or the schedule of network configurations. For example, the one or more processors 310 may generate the network configuration based on at least in part a number of changes from the previous network topology required for the network to implement the network configuration and an amount of time required for the network to make the number of changes. The one or more processors 310 may alternatively generate the schedule of network configurations based on at least in part a number of changes between network topologies of the network configurations in the schedule of network configurations and the amount of time between changes utilizing the information of routing tables. For example, changes may include steering a transceiver to point in a new direction or changing a forwarding rule in a forwarding table stored at a memory of a node. Steering the transceiver may take more take than changing the forwarding table stored at the memory of the node. The generated network configuration may require a number of changes is below a threshold number and/or the amount of time below a threshold amount of time.

For some pairs of subsequent network configurations in the schedule of network configurations, the difference between the earlier network configuration and the later network configuration may be a single change that may not involve changing the direction of transceivers, such as a routing change at a single node.

After the one or more processors 310 has generated the network configuration and routing paths using the solver module 332, the one or more processors 310 may control the nodes of the network 100 according to the topology and routing manager module 326 to implement the topology represented by the generated primary configuration by sending implementation instructions to the nodes to cause the nodes to form the links included in the generated primary configuration (e.g., by steering their respective transceivers, adjusting their respective transmission power levels, setting their transmission and reception frequency bands, etc.) and update forwarding rules in the forwarding tables stored at the memory at each node according to the computed routing paths for the primary configuration and the secondary configuration. For example, for each node, the network controller may send one or more first forwarding rules for implementing the primary configuration. Some forwarding tables may be updated with a schedule of changes based on the schedule of network configurations and may also include instructions to store data at a node before a next hop.

The path control module 334 may cause the one or more processors 310 to generate flight instructions for the airborne nodes, such as balloons 110c, 110e, regarding the flight paths of the airborne nodes or voyage instructions for the maritime nodes, such as unmanned nautical vehicles, regarding the voyage paths of maritime nodes. For example, the one or more processors 310 may be unable to determine a network configuration using the solver module 332 representing a network topology that is capable of satisfying all of the determined network flows. The one or more processors may determine that the reasons for this failure using the solver module 332 is that one or more of the airborne nodes or maritime nodes in the network 100 has travelled too far from the other network nodes to be able to form a link. In response, using the path control module 334, the one or more processors 310 may generate and transmit flight instructions for the airborne nodes of the network 100 that cause the airborne nodes to alter their flight paths, or voyage instructions for the maritime nodes of the network 100 that cause the maritime nodes to alter their voyage paths, such that additional links may be formed. For example, the instructions may cause an airborne node or maritime node to move closer to another node or to avoid obstructions. After the nodes have been repositioned according to the instructions generated by the one or more processors using the path control module 334, an updated table may be created using the topology and routing manager module 326 or the topology determination module 328 based on the new locations of the network nodes. Then, the updated table may be processed by the one or more processors 310 using the solver module 332 to determine a network configuration.

The scheduling module 336 may cause the one or more processors 310 at the network controller 300 to interface with the one or more client devices 350. Using the scheduling module 336, the one or more processors 310 may receive from a client device 350 client data information to be transmitted through the network 100, such as, for example, the sources and destinations for the client data. Other information received from the client device 350 may include data related to client demand, such as amount of client data to be transmitted and a timing for transmission. The information may be stored in memory 320 and/or used according to the flow determination module 330 to determine the determined flows through the network 100. In some implementations, the one or more processors 310 of network controller 300 may request client data information from the one or more client devices 350 based on available bandwidth at the given ground station or the given geographic location using the scheduling module 336.

After the determined flows are determined using the flow determination module 330 and the network configuration is generated using the solver module 332 as described above, the one or more processors 310 may generate routing instructions for transmitting the client data through the network 100 based on the table and the generated network configuration. These routing instructions may include a source location of the client data, a destination location of the client data, and a timing for the transmission of the client data. In some embodiments, the routing instructions may include storage instructions to a node to temporarily store data from a previous node to be transmitted to a next node. The routing instructions may include a schedule that may be stored at a node of the network in directly connectable with the client device 350 sending the client data. The one or more processors 310 may then send the routing instructions to the node directly connectable with the client device 350 to cause the node to receive and initiate transmission of the client data over the determined flow in accordance with the schedule.

In some embodiments where flows are determined without client data information, the scheduling module 336 may cause the one or more processors 310 to send a message to a client device of the one or more client devices 350 regarding indicating availabilities of flows through the network based on the determined flows determined using the flow determination module 330 and the network configuration generated using the solver module 332. The message may also include a time or a time frame at which the flows are available and/or a price for transmission of the data associated with each flow. Using the schedule module 336, the one or more processors 310 may receive a response from one of the one or more client devices 350 that includes a request to use one of the determined flows for transmitting client data. The one or more processors 310 may then send routing instructions to the one or more nodes to initiate transmission of the client data over the determined flow.

Example Methods

Figure 4:
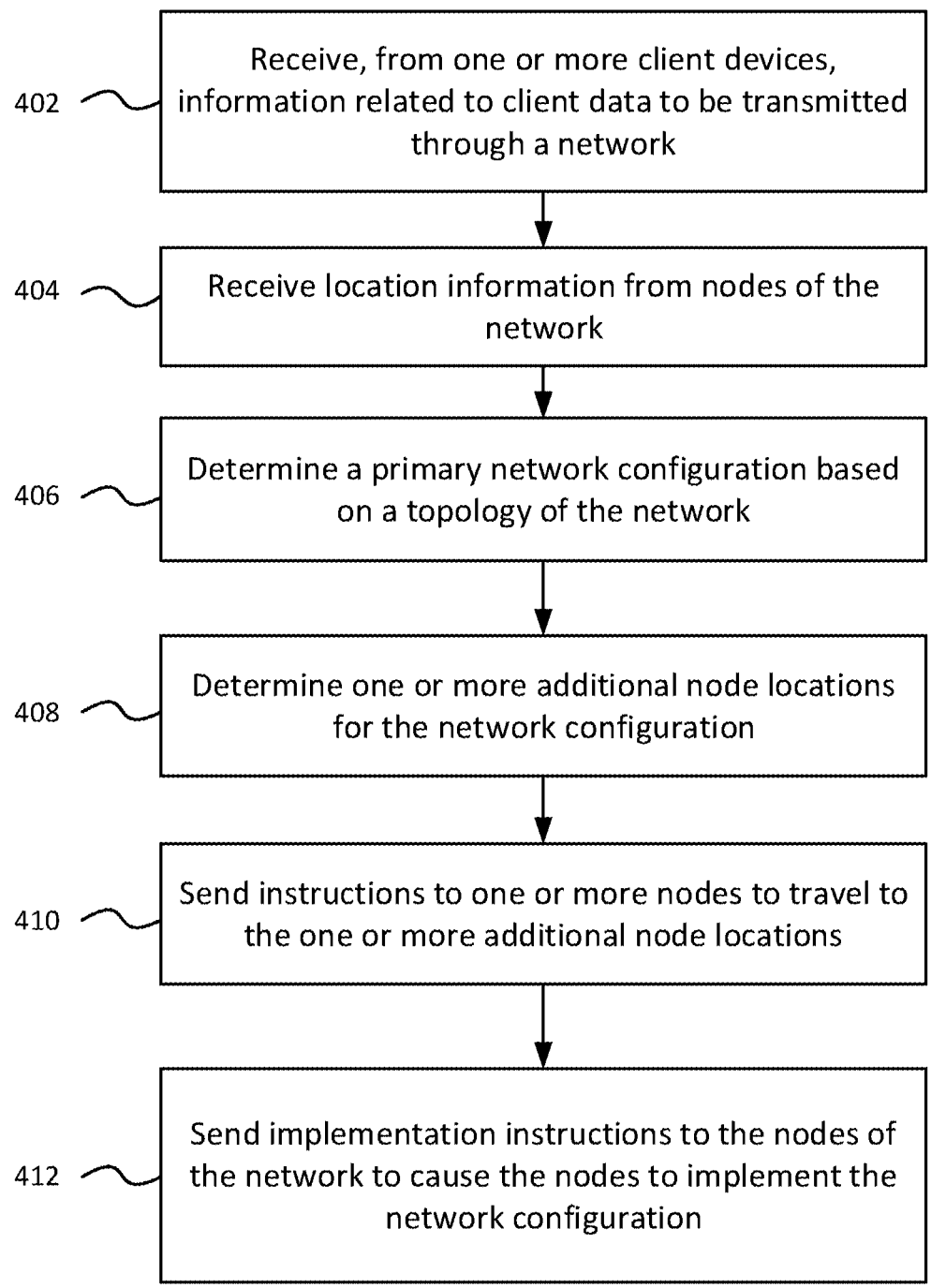
FIG. 4 is a flow diagram 400 of a method in accordance with aspects of the disclosure.

In addition to the systems described above and illustrated in the figures, various operations will now be described. In FIG. 4, flow diagram 400 is shown in accordance with some of the aspects described above that may be performed by the one or more processors 310 of the network controller 300 to determine a network configuration for a maritime network that includes at least one maritime node or at least one aerospace node. The maritime network may provide coverage for nautical vehicles or aerospace vehicles traveling on or above an ocean. Additionally or alternatively, one or more processors of a node may perform one or more of the operations. While FIG. 4 shows blocks in a particular order, the order may be varied and that multiple operations may be performed simultaneously. Also, operations may be added or omitted.

At block 402, the one or more processors 310 of the network controller 300 may receive client information regarding client data to be transmitted through a network 100, such as using scheduling module 336. In some examples, the client information may be received from one or more nodes of the network 100 via communications system 340. The one or more client devices 350 may be in communication with a given node of the network when in range of the given node. For instance, the one or more client devices 350 may be in communication with a given maritime node, such as ship 109a, 109b, when the one or more client devices 350 is on the ship. Likewise, the one or more client devices 350 may be in communication with a given aerospace node, such as plane 110b, when the one or more client devices 110b is on the aerospace node. In other examples, the client information may be received directly from the one or more client devices 350 via communications system 340. The one or more client devices 350 in this example may be mounted on aerospace or nautical vehicles traveling in range of the network controller 300 and configured to communicate with the network controller 300. The client information may include client location information and client data information. The client location information may indicate the location of the given node when the one or more client devices are in communication with the given node. The client data information may also include an amount of data to be transmitted from or to the one or more client devices. In some alternatives, the client information may be predicted by the one or more processors 310 based on a behavior history of one or more client devices or of a given node's coverage area.

Figure 5A:
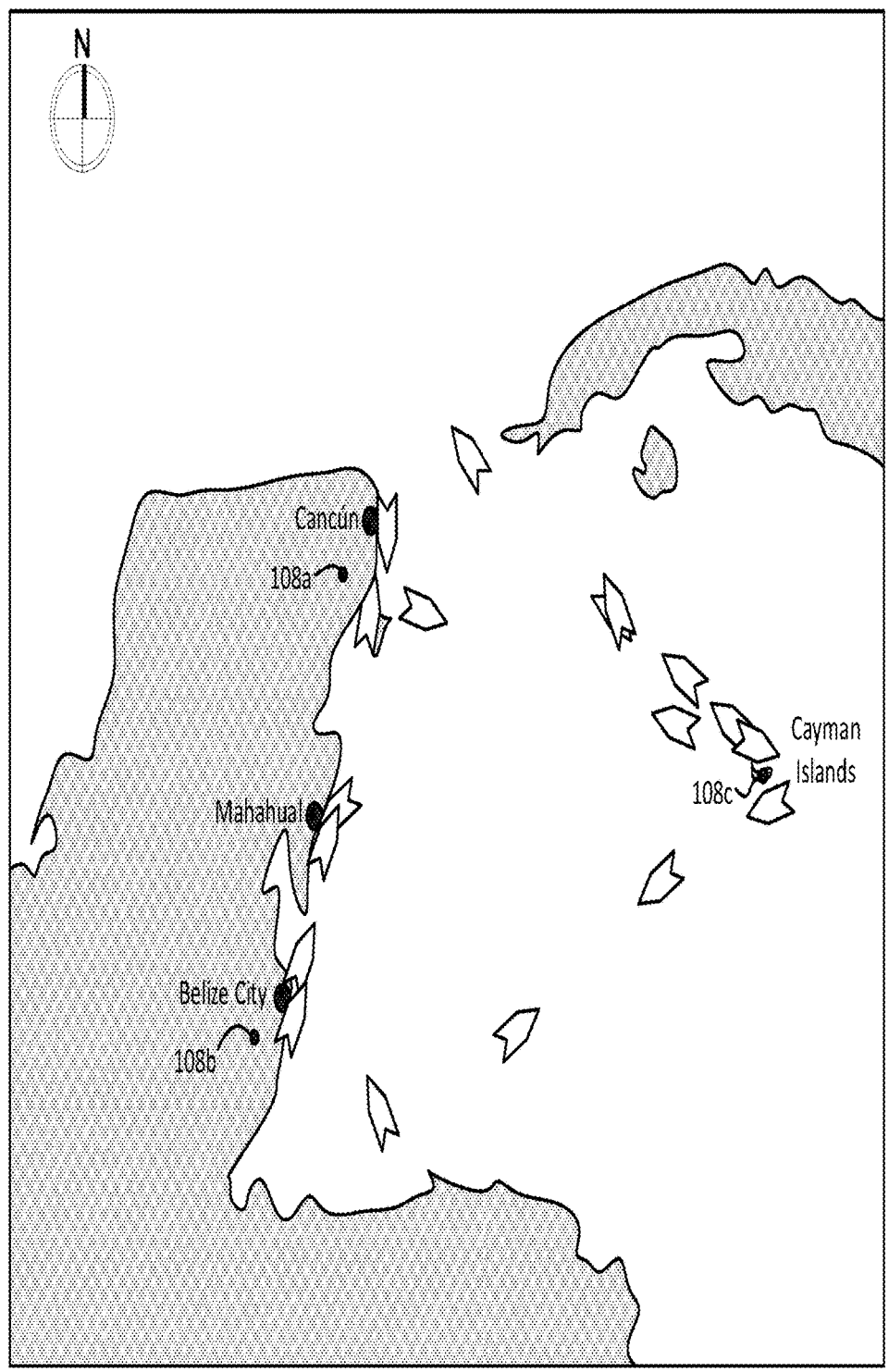
FIGS. 5A-5C show a map 500 of a geographical area in accordance with aspects of the disclosure.

As shown in FIG. 5A, a map 500 shows a plurality of positions of ship 109b carrying or in communication with a client device, illustrating a voyage path of the ship 109b. The plurality of positions includes positions along the Yucatan Peninsula between Belize City and Cancún, positions between Cancún and the Cayman Islands, and positions between the Cayman Islands and Belize City. The ground station 107a is shown at first shore location 108a near Cancun, and the ground station 107b is shown at second shore location 108b near Belize City. In the map 500, a third shore location 108c is shown on the Cayman Islands where another ground station is located. The voyage path for the ship 109b may be received by the one or more processors 310 as part of the client information. In some examples, only a part of the voyage path for the ship 109b corresponding to when the client data is to be transmitted may be received by the one or more processors 310. Alternatively, the one or more processors 310 may receive the plurality of positions of ship 109b shown in map 500, and determine an approximate voyage path for the ship 109b to be the shaded path 502 shown in FIG. 5B that encompasses all the plurality of positions.

Figure 5B:
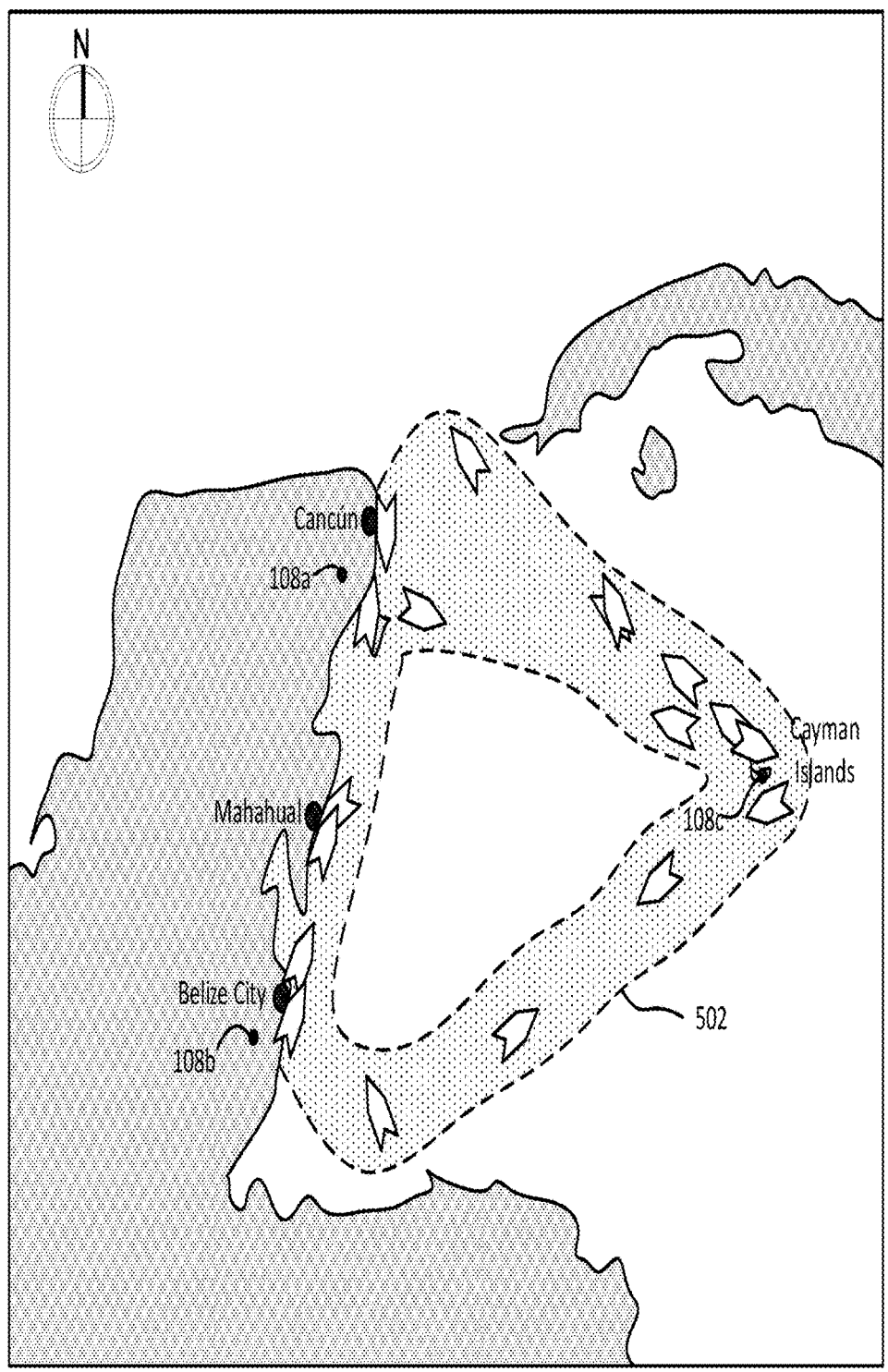

At block 404, the one or more processors 310 of the network controller 300 may also receive location information from each of a plurality of nodes of the network 100, such as using topology and routing manager module 326. The location information may be in GPS coordinates or another type of coordinate. In some examples, a predicted or known trajectory for each node may be included in the location information. A predicted trajectory for a given maritime node or a given aerospace node may be based on a current location and travel characteristics, such as heading, speed, position relative to maritime markers or other ships, etc. For the given maritime node, such as a cruise liner, the known trajectory may be a predetermined voyage path, which indicates a position or a range of positions of the cruise liner over time. The voyage path may include a schedule of when the cruise liner is at positions along the voyage path. In some examples, the network 100 may include a plurality of maritime nodes traveling along a same or similar route. For example, ship 109a may have a same or similar voyage path as ship 109b between Belize City, Cancun, and the Cayman Islands as shown in FIGS. 5A-5B.

Similar location information may be received for an aerospace node and its predicted or known flight trajectory. The location information may also include conditions at or near each location of the plurality of nodes, such as weather conditions.

Figure 5C:
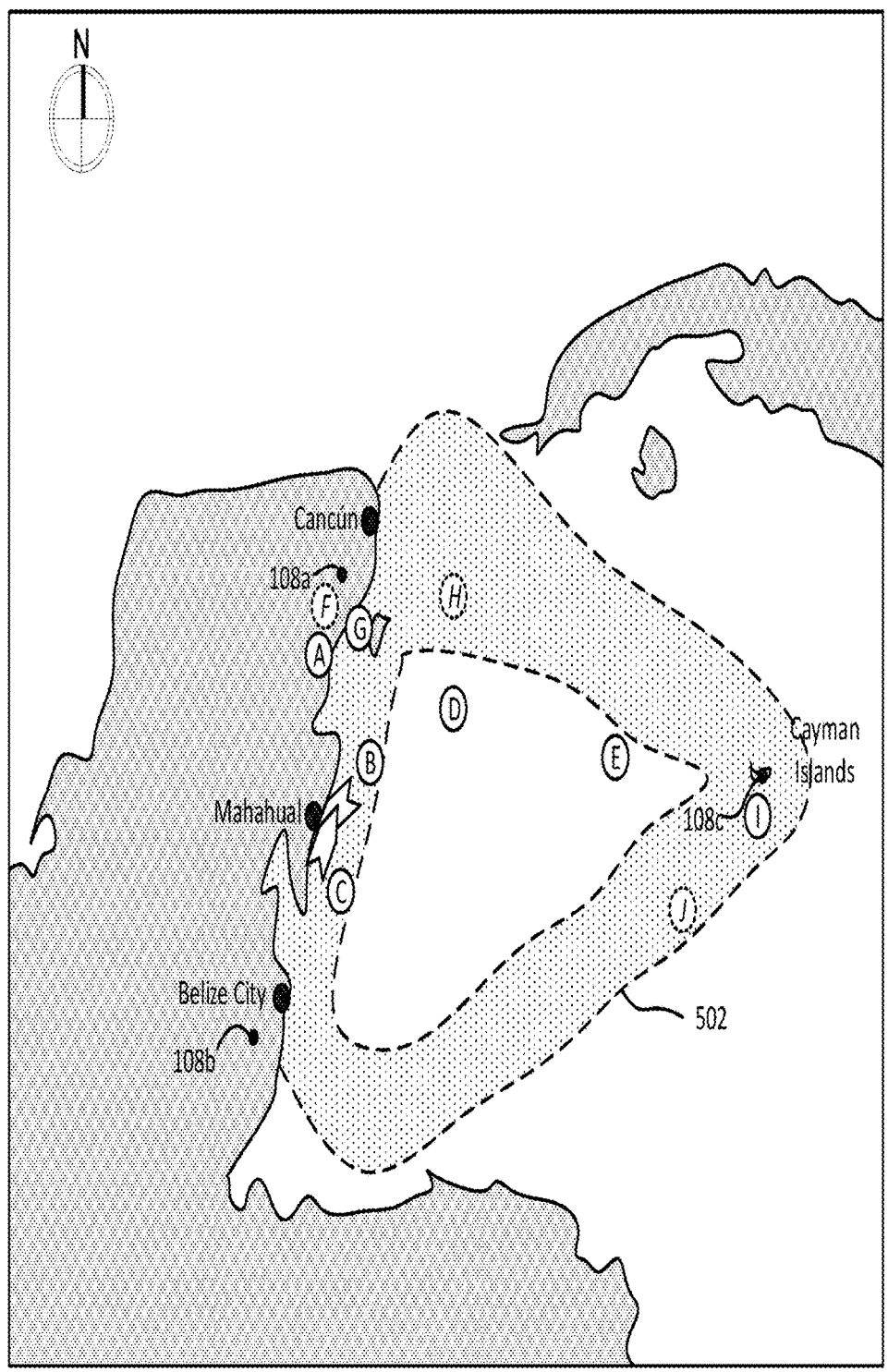

In the example scenario shown in FIG. 5C, the received location information includes that aerospace node 110a is determined to be available at location A where the weather is currently clear, and also is predicted to be at location F in one hour (shown in dotted circle and italics). For aerospace node 110b, the received location information includes being at location B where the weather is generally clear at location B except for a thunderstorm in one direction towards aerospace node 110d. For aerospace nodes 110c, 110d, and 110e, the received location information includes being at respective locations C, D, and E where the weather is also currently clear. For maritime node 109a, the received location information includes being currently located at location G within range of ground station 107a, and predicted to be at location H in one hour (shown in dotted circle and italics), which is out of range of ground station 107a. For maritime node 109b, the received location information includes being currently located at location I close to the Cayman Islands, and being predicted to be at location J in one hour (shown in dotted circle and italics), which is further asea from location I.

At block 406, based on the client information and the location information, the one or more processors 310 of the network controller 300 may determine a network configuration including a plurality of links to be formed for one or more routing paths through the network, such as using solver module 332. In particular, the network configuration may be determined by determining a topology of the network, determining flows through the topology needed for the client data according to the received client data information, and selecting one or more flows through the topology as routing paths for the client data. Moreover, the network configuration may be determined so that distances between hops along a route are less than a maximum distance. The maximum distance is defined by the type of communication signal is being transmitted between nodes. In particular, the maximum distance may be the distance over which a type of communication signal may be reliably transmitted from one node and received by another. The maximum distance may further be defined by conditions at or between nodes that may attenuate the type of communication signal. In some examples, the maximum distance may be 50 kilometers, but may be longer or shorter. When the maritime node associated with the one or more client devices is located more than the maximum distance from any terrestrial node, the network configuration may include a link between the maritime node and an aerospace node or another maritime node as an intermediate hop before a hop to a terrestrial node. When the maritime node is one of the plurality of maritime nodes traveling along the same or similar route, the network configuration may include one or more links with another maritime node in the plurality of maritime nodes.

To determine the topology of the network 100, the one or more processors 310 may use topology determination module 328. The location information received from each of the plurality of nodes of the network 100 for when the client data is to be transmitted through the network 100 may be selected. The topology may include available nodes, possible links, and corresponding data related to conditions of the available nodes and possible links. The network controller may take into account the location information for location of the given maritime node associated with a given client device, a predicted amount of data to be routed to and from the given maritime node, location information for the plurality of nodes in the network, and conditions at each of the locations of the plurality of nodes.

Figure 6:
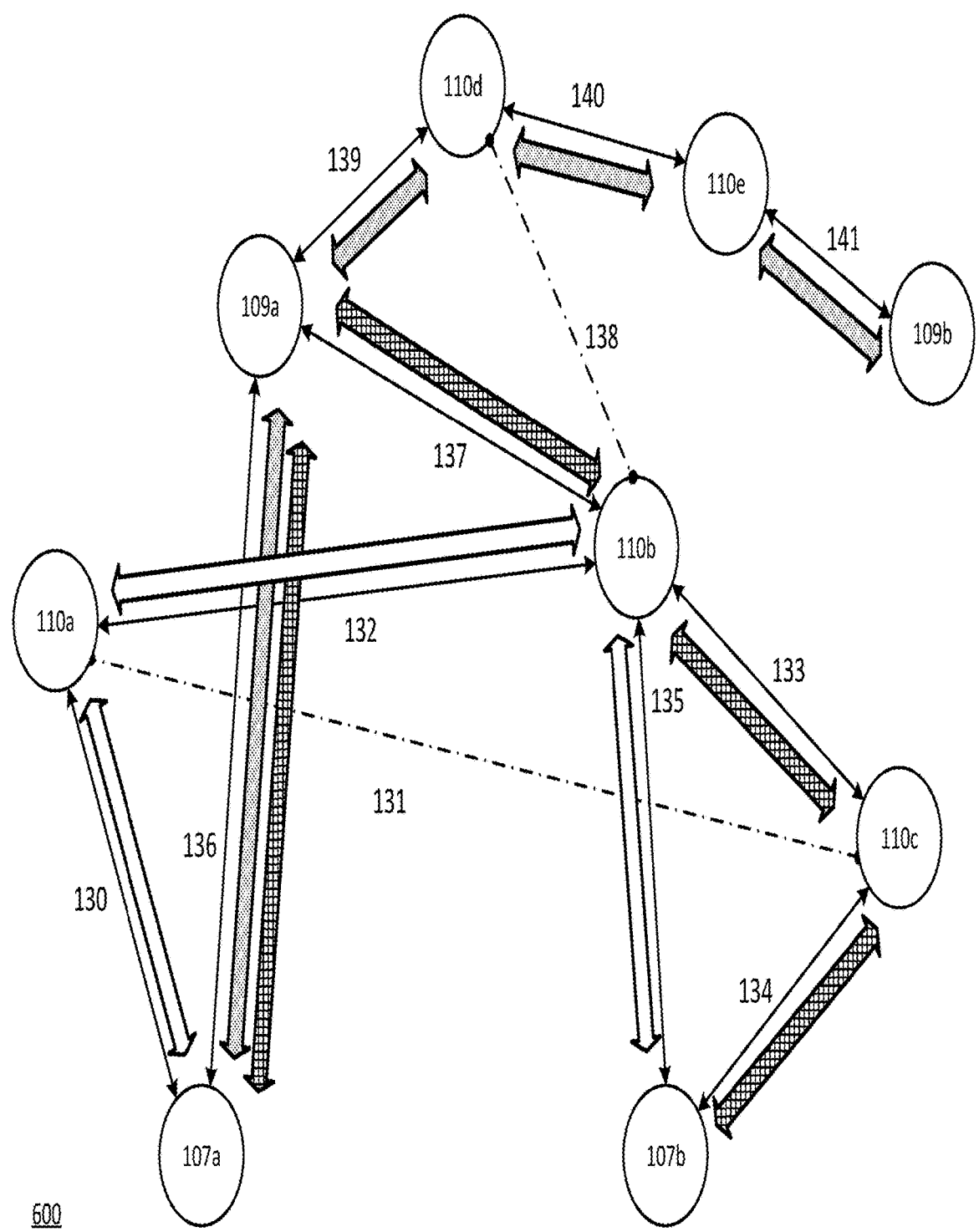
FIG. 6 is a functional diagram of a topology 600 of the network 100 shown in FIG. 1 in accordance with aspects of the disclosure.

According to the received information about nodes 109a-109b, 110a-110e, a current topology 600 may be determined to include all the nodes, as shown in FIG. 6, since they are available at their current locations shown in FIG. 5C. In another example, if aerospace node 110c did not report its location at location C to one or more processors 310 but previously reported a flight path or a trajectory using the flight control module 334, the one or more processors 310 may determine that aerospace node 110c currently is at location C based on the flight path or trajectory and include aerospace node 110c in the current topology. In addition, links 130, 132-137, and 139-141 are included in the topology 600 (shown in FIG. 6 as solid arrows) since they are available at the current time, while links 131 and 138 are not available (shown in dash-dot lines). Links 130, 132-137, and 139-141 may be determined as available based on ranges of each link or based on signals successfully transmitted between pairs of nodes. For link 131, it may be determined that the link 131 has failed at the current time based on the indication of unresponsiveness of aerospace node 110c to requests from aerospace node 110a. For link 138, it may be determined that the link 138 is unavailable at the current time due to the thunderstorm between aerospace node 110b and aerospace node 110d. For link 136, it may be determined that the link 136 is not available at the future time due to the maritime node 109a moving out of range of ground station 107a. Available nodes and possible links may also be determined for a different point in time other than the current time based on predicted future locations of nodes or predicted conditions at each node, such as weather forecasts. In some implementations, each possible link in the current topology may also be labeled with link metrics, such as bandwidth, that are determined based on the received information.

The one or more processors 310 may further use flow determination module 330 to determine possible flows. The possible flows may be determined according to the nodes and links in the topology, desired destinations of client data, and other requirements for the client data. One or more of the possible flows may be selected for the network configuration to satisfy the requirements for the client data using the capabilities of the network nodes. As shown in FIG. 6, from a plurality of possible flows from ground station 107b to ground station 107a, a first routing path shown in light colored arrows may be selected for first client data; from a plurality of possible flows from ground station 107a to ground station 107b, a second routing path shown in hashed-filled arrows may be selected for second client data; and from a plurality of possible flows from ship 109a to ground station 107a, a third routing path shown in grey-colored arrows may be selected for third client data. In some implementations, more than one routing path may be selected for given client data based on bandwidth constraints or needs.

The first routing path may include a first path portion is from ground station 107b through link 135 to aerospace node 110b, a second path portion is from aerospace node 110b through link 132 to aerospace node 110a, and a third path portion is from aerospace node 110a through link 130 to ground station 107a. The second routing path may include a first path portion from ground station 107a through link 136 to maritime node 109a, a second path portion from maritime node 109a through link 137 to aerospace node 110b, a third path portion from aerospace node 110b through link 133 to aerospace node 110c, and a fourth path portion from aerospace node 110c through link 134 to ground station 107b. The third routing path may include a first path portion from maritime node 109b through link 141 to aerospace node 110e, a second path portion from aerospace node 110e through link 140 to aerospace node 110d, a third path portion from aerospace node 110d through link 139 to maritime node 109a, and a fourth routing path portion from maritime node 109a through link 136 to ground station 107a. As shown in the third routing path, the ship 109b has client data to be transmitted to ground station 107a, but is more than the 50-kilometer maximum distance from the ground station 107a. Therefore, it is necessary to have the hops to aerospace node 110e, aerospace node 110d, and ship 109a to reach ground station 107a.

Figure 7:
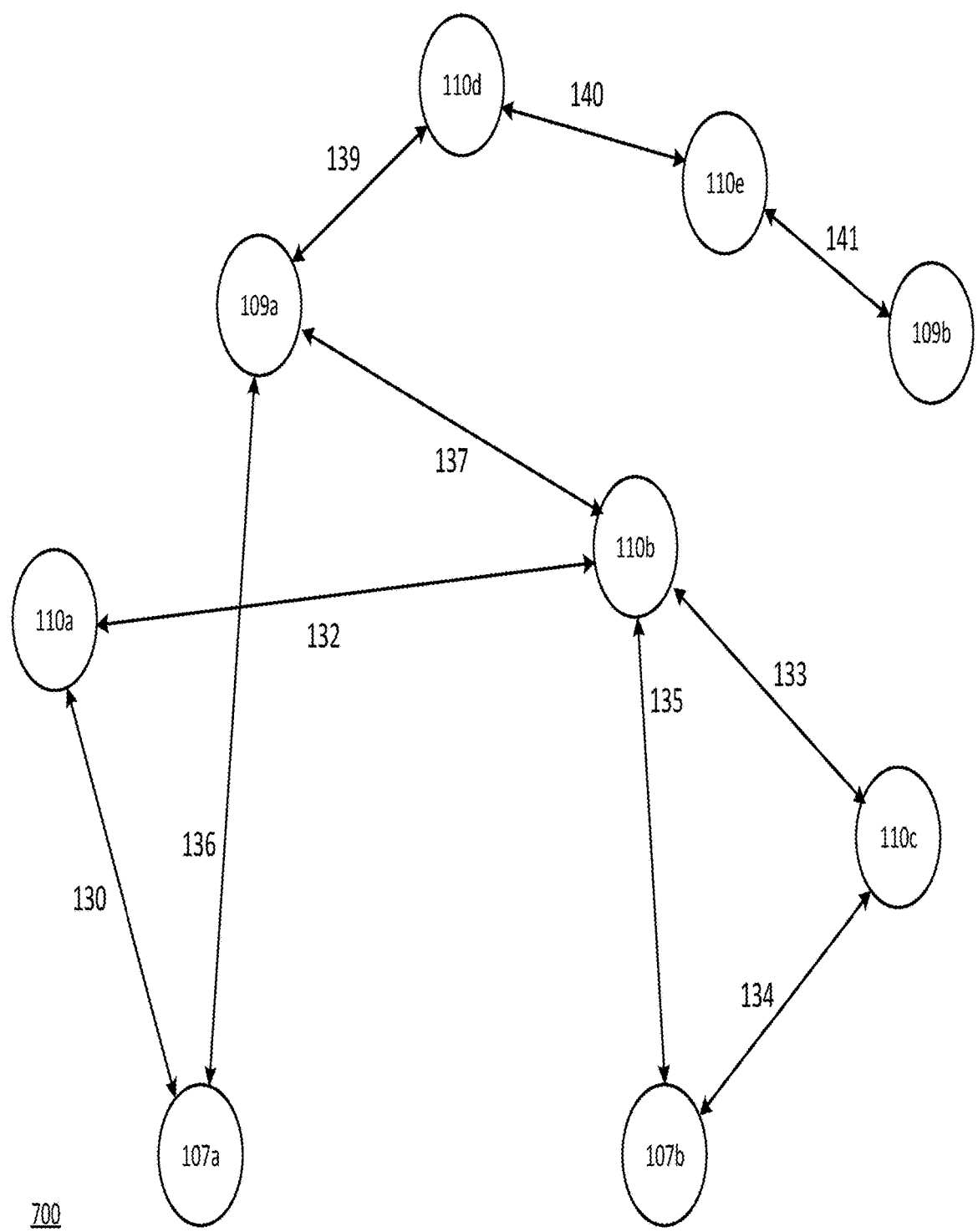
FIG. 7 is a functional diagram of a primary network configuration 700 of the network 100 in accordance with aspects of the disclosure.

Based on the routing paths for the client data to be transmitted through the network at the current time, the one or more processors 310 may determine the network configuration 700 to include the links 130, 132-137, 139-141, as shown in FIG. 7. Links that are omitted from the network configuration, such as links 131 and 138, need not be formed at the current time. Determining the network configuration 700 may also include determining routing instructions, or forwarding rules, for each routing path to be sent to one or more nodes of the network. The routing instructions may include instructions regarding forming the links in the network configuration, such as pointing directions, switch settings, or beam configurations. The routing instructions may also include forwarding rules for client data encapsulated in packets carrying the client data.

Additionally, at block 408, the one or more processors 310 of the network controller 300 may determine one or more additional node locations as part of the network configuration. The one or more node locations may be determined to complete a backhaul link for the given node associated with the one or more client devices or the client device when it is traveling through a zone where there is a lack of backhaul coverage. In other examples, the one or more node locations may be determined to complete an access link for where there is lack of coverage. The one or more node locations may further be determined for a specific point in time that the given node or client device is traveling in a zone. In other examples, the one or more node locations may be determined to be more permanent for continual coverage for zone and any nodes travelling through the zone.

The one or more node locations may be locations to which unmanned aerial vehicles, such as balloons or drones, or unmanned nautical vehicles may be controlled to travel or predicted locations of a node traveling on a set path.

The one or more processors 310 of the network controller 300 may identify at least one zone where the given maritime node is outside the range of another node in the network, or vice versa. The one or more node locations may be determined to provide service to the given maritime node when the given maritime node is in the at least one zone. For example, the one or more node locations may be where aerospace nodes or other maritime nodes are in range of the at least one zone to link the given maritime node in the at least one zone with another node of the network. The one or more node locations may also be determined based on predicted conditions at the given maritime node location or between the maritime node location and a possible aerospace location.

Figure 8:
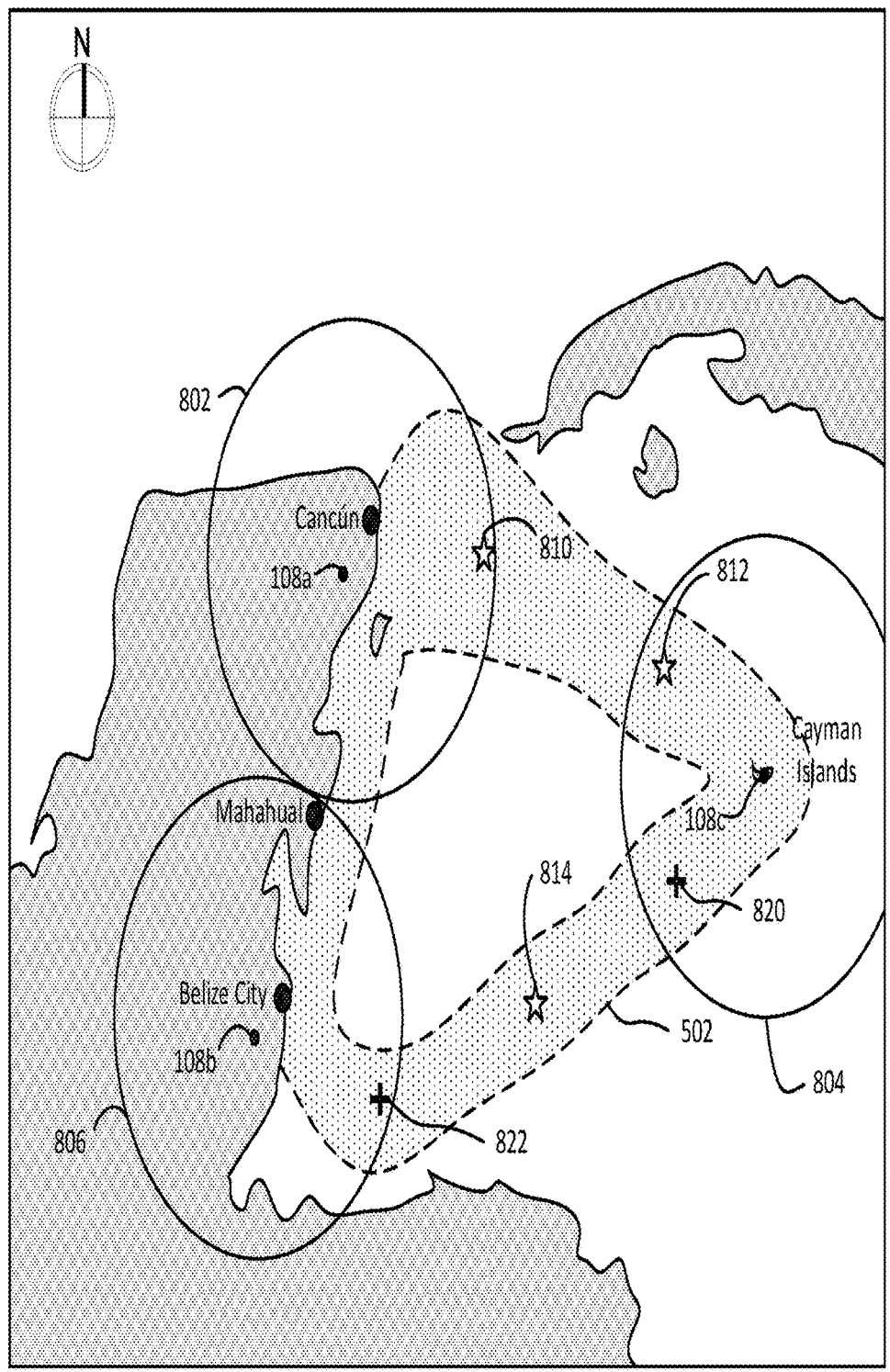
FIG. 8 is another view of map 500 in accordance with aspects of the disclosure.

In the example shown in FIG. 8, the zone may include the areas of the approximate voyage route 502 of ship 109*b* that are outside of the ranges of ground stations 107*a*, 107*b*, 107*c*, which are illustrated by circles 802, 804, 806, respectively. When ship 109*b* is traveling the portion of the voyage path 502 between Cancúm and the Cayman Islands, there is a first area where the ship 109*a* is not able to communicate with ground station 107*a* by Cancúm nor ground station 107*c* on the Cayman Islands. In this scenario, the one or more processors 310 may determine aerospace location 810 for providing an intermediate hop for the first area to ground station 107*a*, and an aerospace location 812 for providing an intermediate hop for the area to ground station 107*c*. When ship 109*a* is traveling the portion of the voyage path 502 between the Cayman Islands and Belize City, there is a second area where the ship 109*a* is not able to communicate with ground station 107*c* on the Cayman Island nor ground station 107*b* by Belize City. In this scenario, the one or more processors 310 may determine an aerospace location 814, as well as maritime locations 820 and 822. The maritime location 820 is for an unmanned nautical vehicle, and the maritime location 822 is a predicted location of ship 109*a* when ship 109*b* is in the second area.

At block 410, the one or more processors 310 of the network controller 300 may send instructions to one or more nodes to travel to the one or more node locations, such as using path control module 334. In some examples, the instructions may include instructions for performing station keeping at the one or more node locations. The one or more nodes may be selected based on the location information, system conditions, or other characteristics. For example, aerospace node 110*d* may be sent instructions to travel to aerospace location 810, and aerospace node 110*e* may be sent instructions to travel to 812, given that they are the closest to those respective locations. Additional nodes not originally in the network may be sent to the one or more node locations or to provide additional support to the one or more nodes at the one or more node locations or to the plurality of terrestrial nodes in the network. In some cases, one or more additional nodes may be sent to locations between a given node location and a terrestrial node location to link the node at the given node location with the terrestrial node location.

As further shown in FIG. 4, at block 412, the one or more processors 310 of the network controller 300 may send implementation instructions to the nodes 107, 109, 110 of the network 100 to cause the nodes of the network to implement of the network configuration. In the example scenario, for the network configuration, the implementation instructions to nodes 107, 109, 110 may include instructions to form links and implement at least the routing path portions shown in FIG. 7. The implementation instructions may therefore include instructions to ground station 107*a* to point one or more transceivers towards aerospace node 110*a* and ship 109*a* to form links 130 and 136, respectively; instructions to ground station 107*b* to point one or more transceivers towards aerospace nodes 110*b* and 110*c* to form links 135 and 134, respectively; instructions to aerospace node 110*a* to point one or more transceivers towards ground station 107*a* and aerospace node 110*b* to form links 130 and 132, respectively; instructions to aerospace node 110*b* to point one or more transceivers towards ground station 107*b*, aerospace node 110*a*, aerospace node 110*c*, and ship 109*a* to form links 135, 132, 133, and 137, respectively; instructions to aerospace node 110*c* to point one or more transceivers towards ground station 107*b* and aerospace node 110*b* to form links 134 and 133, respectively; instructions to ship 109*a* to point one or more transceivers towards ground station 107*a*, aerospace node 110*b*, and aerospace node 110*d* to form links 136, 137, and 139, respectively; instructions to aerospace node 110*d* to point one or more transceivers towards ship 109*a* and aerospace node 110*e* to form links 139 and 140, respectively; instructions to aerospace node 110*e* to point one or more transceivers towards 110*d* and ship 109*b* to form links 140 and 141, respectively; and instructions to ship 109*b* to point one or more transceivers towards aerospace node 110*e* to form link 141. In some cases, one or more of the links in the network configuration may already be formed, in which case no change to the direction of the transceivers is necessary.

For a network configuration generated for a future time, a future time frame, or other point in time, the implementation instructions may include storing scheduled changes in the network 100, such as steering transceivers to implement new routing paths, at each node that may occur before transmitting client data at the future point in time. The implementation instructions may therefore include updating forwarding rules in forwarding tables at each node with new routing paths and time or a time frame for implementing the new routing paths according to the future network configuration. When the time or time frame arrives, the nodes 107, 109, 110 of network 100 may be caused to automatically implement the future network configuration according to the implementation instructions.

While the network configuration 700 described above is generated in part for client data associated with maritime node 109*b*, the same process may be performed for client data associated with an aerospace node, such as plane 110*b*, or a client airliner flying above the area shown in map 500. Client data information may be received from the node or client or may be predicted given a history of the client airliner or estimated behavior of a number of client devices associated with the node or client, similar to block 402. The at least one zone identified by the one or more processors 310 may include lanes in the air that has most air traffic for airliners or other planes in the area, similar to FIG. 5C described above and in block 406. The network configuration, including particular node locations, may be determined for the aerospace or maritime nodes to support the at least one zones, as described above in blocks 406 and 408. The instructions may then be sent to the nodes of the network, as described above in blocks 410 and 412. The one or more transceivers of nodes in communication with such an aerospace node or client airliner is pointed higher up than nodes in communication with a maritime node or a terrestrial node.

As such, there may be a particular type of node, such as a balloon, that is configured to provide access to the aerospace node or client airliner.

The technology herein creates a network that supports a maritime node, such as a cruise liner. Aerospace nodes and other maritime nodes may form a mesh network that can provide access or backhaul service to the maritime node from a terrestrial node even when the maritime node is not in range of the terrestrial node. By utilizing aerospace nodes, such as high-altitude platforms, and other maritime nodes, the cost of capacity and the latency in the network may be reduced. In addition, aerospace nodes may provide additional bandwidth for communications to and from the maritime node. Furthermore, being able to adjust locations of aerospace nodes may add robustness to the network when weather or objects near the maritime node possibly cause obstructions.

Unless otherwise stated, the foregoing examples and embodiments are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed:

1. A method of generating a network configuration for a maritime network, the method comprising:
   determining that one or more of at least one maritime node or at least one aerospace node of the maritime network are not able to form a link in the maritime network due to a location of the one or more of at least one maritime node or at least one aerospace node;
   generating and transmitting flight instructions to cause the one or more of at least one maritime node or at least one aerospace node that are not able to form the link to alter a path of the one or more of at least one maritime node or at least one aerospace node, wherein additional links may be formed within the maritime network as a result of the altered path;
   receiving updated location information from a plurality of nodes in the maritime network, the updated location information including predicted or known trajectories of the one or more of at least one maritime node or at least one aerospace node based on the altered path; and
   determining a network configuration including a plurality of links to be formed for one or more routing paths through the plurality of nodes based on the updated location information.

2. The method of claim 1, wherein the one or more of at least one maritime node or at least one aerospace node are not able to form a link in the maritime network due to traveling too far from other maritime network nodes.

3. The method of claim 1, the plurality of links includes a link between a given node, wherein the given node is one of the one or more of at least one maritime node or at least one aerospace node, and another node in the maritime network that is within a maximum distance from the given node, and wherein the maximum distance is defined by a type of communication signal used for the plurality of links.

4. The method of claim 3, wherein the determining the network configuration includes determining one or more additional node locations for the network configuration.

5. The method of claim 4, wherein the determining one or more additional node locations includes: identifying at least one zone in a path for the given node where there is a lack of backhaul coverage; and determining the one or more additional node locations to form a complete backhaul link for the given node.

6. The method of claim 5, wherein the identifying at least one zone is further based on where there is a highest amount of traffic in over time.

7. The method of claim 4, further comprising sending instructions to one or more nodes of the maritime network to travel to the one or more additional node locations to implement the network configuration.

8. The method of claim 7, wherein the instructions include instructions to perform station keeping at the one or more additional node locations.

9. The method of claim 7, wherein the one or more additional node locations include aerospace locations corresponding to one or more aerospace nodes.

10. The method of claim 1, wherein the plurality of nodes further includes a first terrestrial node on a first land mass and a second terrestrial node on a second land mass separate from the first land mass.

11. A system comprising:
    a network controller including one or more processors configured to communicate with a plurality of nodes in a maritime network, the one or more processors being configured to:
    determine that one or more of at least one maritime node or at least one aerospace node of the maritime network are not able to form a link in the maritime network due to a location of the one or more of at least one maritime node or at least one aerospace node;
    generate and transmit flight instructions to cause the one or more of at least one maritime node or at least one aerospace node that are not able to form the link to alter a path of the one or more of at least one maritime node or at least one aerospace node, wherein additional links may be formed within the maritime network as a result of the altered path;
    receive updated location information from a plurality of nodes in the maritime network, the updated location information including predicted or known trajectories of the one ore more of at least one maritime node or at least one aerospace node based on the altered path; and
    determine a network configuration including a plurality of links to be formed for one or more routing paths through the plurality of nodes based on the updated location information.

12. The system of claim 11, wherein the one or more of at least one maritime node or at least one aerospace node are not able to form a link in the maritime network due to traveling too far from other maritime network nodes.

13. The system of claim 11, wherein the plurality of links includes a link between a given node, wherein the given node is one of the one or more of at least one maritime node or at least one aerospace node, and another node in the maritime network that is within a maximum distance from the given node, and wherein the maximum distance is defined by a type of communication signal used for the plurality of links.

14. The system of claim 13, wherein the network configuration is determined to include one or more additional node locations for the network configuration.

15. The system of claim 14, wherein the one or more processors are further configured to determine the one or more additional node locations based on: at least one zone in a path for the given node where there is a lack of backhaul coverage; and requirements for forming a complete backhaul link for the given node.

16. The system of claim 15, wherein the at least one zone is based on where there is a highest amount of traffic in over time.

17. The system of claim 14, wherein the one or more processors are further configured to send instructions to one or more nodes of the maritime network to travel to the one or more additional node locations to implement the network configuration.

18. The system of claim 17, wherein the instructions include instructions to perform station keeping at the one or more additional node locations.

19. The system of claim 17, wherein the one or more additional node locations include aerospace locations corresponding to one or more aerospace nodes.

20. The system of claim 11, wherein the plurality of nodes further includes a first terrestrial node on a first land mass and a second terrestrial node on a second land mass separate from the first land mass.

* * * * *